US008708794B2

(12) United States Patent
Morrow

(10) Patent No.: US 8,708,794 B2
(45) Date of Patent: Apr. 29, 2014

(54) GAMING SYSTEM AND A METHOD OF GAMING INCLUDING PARAMETER FOR THE AWARDS DETERMINED BY PARTIES

(75) Inventor: James Morrow, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 526 days.

(21) Appl. No.: 12/943,654

(22) Filed: Nov. 10, 2010

(65) Prior Publication Data

US 2012/0115561 A1 May 10, 2012

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................................. 463/16; 463/26; 463/27

(58) Field of Classification Search
USPC ................................................ 463/16, 26, 27
See application file for complete search history.

(56) References Cited

U.S. PATENT DOCUMENTS 4,991,846 A 2/1991 Sondej
5,655,961 A 8/1997 Acres et al.
6,012,982 A 1/2000 Piechowiak et al.
6,110,043 A 8/2000 Olsen
6,454,648 B1 9/2002 Kelly et al.
7,980,947 B2 * 7/2011 Michaelson et al. ............ 463/27
2001/0049303 A1 12/2001 Found et al.
2003/0027630 A1 2/2003 Kelly et al.
2004/0242320 A1 * 12/2004 Jackson .......................... 463/26
2007/0218982 A1 * 9/2007 Baerlocher ..................... 463/27
2008/0039191 A1 2/2008 Cuddy
2009/0088244 A1 4/2009 Nicely et al.
2009/0117972 A1 5/2009 Cava

FOREIGN PATENT DOCUMENTS

WO 9712338 4/1997
WO 9815928 4/1998
WO 0132280 5/2001
WO 0207836 1/2002
WO 2007106659 9/2007

* cited by examiner

*Primary Examiner* — William M. Brewster

(74) *Attorney, Agent, or Firm* — Hanley, Flight and Zimmerman, LLC

(57) ABSTRACT

A gaming system providing a progressive link includes a game controller arranged to facilitate play of a game by a player in association with a progressive link, the progressive link including a progressive award; and an incremental award stored in a memory, the incremental award associated with and funded apart from the progressive award associated with the progressive link. The game controller is to award the progressive award plus the incremental award to a player based on a criterion established by an operator associated with the progressive link.

49 Claims, 9 Drawing Sheets

GAMING SYSTEM AND A METHOD OF GAMING INCLUDING PARAMETER FOR THE AWARDS DETERMINED BY PARTIES

FIELD OF THE INVENTION

The present invention relates to gaming systems and to methods of gaming.

BACKGROUND

Current electronic gaming machines allow a player to place a wager or bet, in return for which a play of the game provided by the gaming machine is conducted. Many venues offer a progressive jackpot, provided by a plurality of gaming machines participating in the jackpot, to be conducted. Typically, a portion of turnover on each gaming machine is forwarded to a jackpot controller as a contribution. That is, part of each wager goes towards the jackpot. The technique can be extended to a so called wide area jackpot where gaming machines from a number of different venues contribute to a single jackpot pool.

SUMMARY

Certain examples provide a gaming system providing a progressive link. The system includes a game controller arranged to facilitate play of a game by a player in association with a progressive link, the progressive link including a progressive award; and an incremental award stored in a memory, the incremental award associated with and funded apart from the progressive award associated with the progressive link. The game controller is to award the progressive award plus the incremental award to a player based on a criterion established by an operator associated with the progressive link.

Certain examples provide a game controller arranged to facilitate play of a game for a base award plus an incremental award stored in a memory, the incremental award associated with and funded apart from the base award, wherein the game controller is to award the base award plus the incremental award to a player based on a criterion established by an operator associated with the game.

Certain examples provide a method of gaming including offering access to a progressive link adapted for play by a plurality of players, each player having a chance to win a progressive award associated with the progressive link; providing an incremental award in association with the progressive link, the incremental award funded apart from player contribution to the progressive award through wagering associated with the progressive link; facilitating play of a game associated with the progressive link; and awarding the progressive award plus the incremental award to a player based on an award criterion.

Certain examples provide a tangible computer readable storage medium having computer readable program code embodied therein for causing a computer to provide a method of gaming. The method includes offering access to a progressive link adapted for play by a plurality of players, each player having a chance to win a progressive award associated with the progressive link; providing an incremental award in association with the progressive link, the incremental award funded apart from player contribution to the progressive award through wagering associated with the progressive link; facilitating play of a game associated with the progressive link; and awarding the progressive award plus the incremental award to a player based on an award criterion.

BRIEF DESCRIPTION OF THE DRAWINGS

Certain embodiments of the present invention will now be described, by way of example only, with reference to the accompanying drawings, in which:

FIG. 6 is a schematic diagram of an example game play mechanism operated by a player to make a selection and input game instructions to a game controller.

Figure 1:
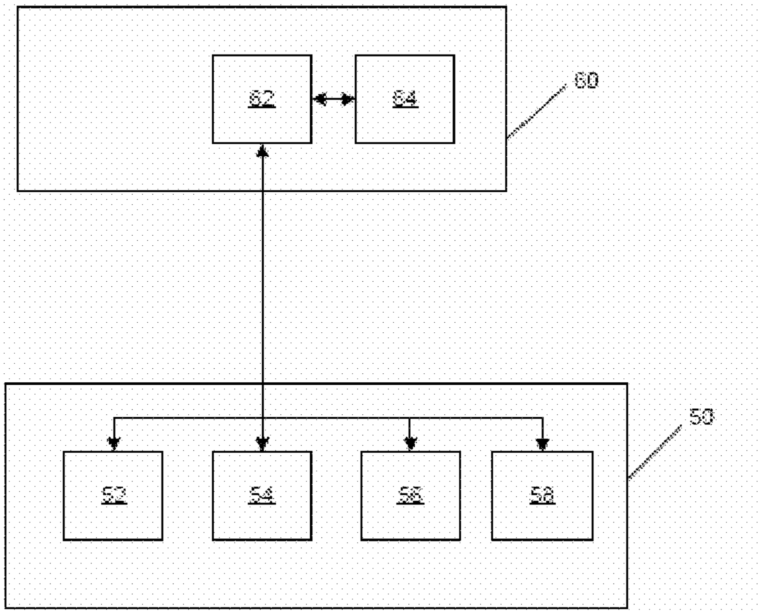
FIG. 1 is a schematic block diagram of components of an example gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, Blu-ray, DVD, CD, etc. storing the software and/or firmware.

Certain examples provide progressive games that offer one or more awards to participating game players. A controller, such as a central controller, having bulk contribution or increment capabilities (e.g., Aristocrat Technologies Vertex controller) can be used to provide one or more progressive link awards across all or part of a casino floor and/or across multiple properties for individual and/or multiple-linked games. The controller system can be used to generate pre-funded incremental link awards to one or more games across one or more sets of participating gaming machines (and/or other gaming devices). The system can be configurable, supporting variations in triggers, pay scenarios, funding mechanisms, and/or other parameters. Awards can include money, points, and/or other items of value (e.g., tickets, discounts, merchandise, trips, etc.), for example. Funding for bulk contributions may not be provided by player coin-in but rather but can rather be provided by additional cash contribution, points, merchandise, and/or other items of value provided by an operator, another vendor, and/or source of contribution (e.g., marketing, sales, lottery, individual, etc.).

In certain examples, a central controller (e.g., an Aristocrat Vertex™ controller) is connected to one or more electronic gaming machines (EGMs) and/or other gaming devices on one or more gaming floors (and/or other connected gaming areas. The controller and connected machines form a progressive link with an award profile (e.g., mini jackpot, minor jackpot, major jackpot, grand jackpot). A casino management, advertiser, and/or other sponsor can fund additional or incremental increases to the link awards above the normal or standard link awards (e.g., via marketing or promotional funds, merchandise/event/trip giveaways, etc.). Thus, one operator can run the same link as another operator but have higher award value(s) for their link to provide an incentive for customers to visit their property(ies).

Rather than being set by the gaming machine manufacturer, incremental link award parameters can be configured by a site operator using their controller. Parameters can include but are not limited to start time, stop time, trigger, an award curve, etc. An award curve relates to a frequency and size of link award, for example. In a multi-property example, management for all properties can fund the incremental pool. In some examples, a third party entity can also fund the pool (e.g., the company providing the controller, a consumer product and/or service provider, other sponsor, etc.). In some examples, one or more advertisers can provide shopping points, Internet award points, stocks, bonds, and/or ecommerce money as an incremental link prize or reward.

Incremental link awards are increased and/or otherwise rolled up based on link criteria set between participating gaming machines and the attached link, such as a jackpot (e.g., Hyperlink® jackpot), a lack of a jackpot following a certain period of play, etc. In some examples, the amount of increment over the period can be tailored using a configurable curve related to a percentage of payout over the time period. Using a curve or spectrum to control the increment, an operator can choose to front load more of the bonus payouts at the beginning of the bonusing period, for example.

As discussed above, in some examples, the incremental link award pool can be funded with cash but implementations are not limited to cash only or monetary award pools. Other awards can include points (e.g., casino/hotel operator reward points, airline points, game provider points, etc.), sweepstake/raffle tickets, discounted or free rooms, discounted or free meals, discounted or free shows, discounted or free travel, discounted or free merchandise, etc.

Triggers for the incremental award increase can include jackpots, such as a jackpot award to a player wherein the controller would add the additional/incremental award on top of the jackpot award. Triggers can also include a lack of jackpot and/or other award for a given amount of game play (and/or a given amount of elapsed time), random mystery payouts, a fixed increment rate based on time (e.g., a meter increase in "bulk" increments), etc. Awards of the link amounts can be based on the game(s) and link logic, for example.

In certain examples, incremental link award periods and/or criteria can be scheduled in advance. For example, an operator can configure an incremental link award such that on Tuesday at 9:00 AM at his/her Las Vegas property all JAWS® link awards are to increase by ten percent (10%) every fifteen minutes with funding provided by casino marketing money bolstered by Aristocrat marketing money and a featured sponsor's marketing dollars. Different periods of award and/or criteria can overlap, for example.

In some examples, individual game awards can be increased by an amount determined by the operator and funded by the operator and/or other source. While the controller resolves and distributes funding, the award is not considered a jackpot but rather is related to the individual game award. The incremental amount increases the individual game award to make a game that would otherwise be the same as in other locations unique to a particular operator and/or location.

Thus, in one example operation, a central controller or computer sends a reconfiguration command to electronic gaming machines (EGMs) that causes the machines to pay one or more different pay tables (e.g., utilizing a pool of bonus money derived at least in part by coin-in). An incremental award is added to an award amount associated with the pool of bonus money. A third party and/or gaming floor operator funds the incremental link award amount. The award amount can be tied to a particular progressive link or a sub-award of that link. The incremental link award increases based on one or more metrics, criteria, etc., as specified by the operator, such as time, percentage of handle, percentage of coin-in, and/or other parameter(s) that curve over time. The controller issues the link increments from a pre-established pool of cash, points, and/or other award(s) such as a pool derived from marketing and/or other similar funds not necessarily related to coin-in. The incremental link award can be offered to a particular bank of machines, casino floor, casino property, multiple casino grouping, multiple jurisdiction grouping, etc. Using the progressive link with an incremental link award allows an operator, from a central point, to offer players a familiar game and link but with an added incentive (e.g., special and/or higher award(s)) that is unique to that property/operator. Such a combination provides more excitement and incentive to the players.

Alternatively or in addition, a similar controller mechanism applies an incremental award to one or more individual game awards rather than a progressive link. The increased award can be provided by information exchanged between a gaming machine and a controller and can be set by the operator, for example. An increased base game award can be operated without the presence of a link (e.g., a progressive link), for example.

Referring to the drawings, there is shown gaming methods and systems having a game controller arranged to implement a game including a progressive jackpot having a prize.

The gaming system can take a number of different forms. In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisioned. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term “processor” is used to refer generically to any device that can process game play instructions in accordance with game play rules and may include: a microprocessor, microcontroller, programmable logic device or other computational device, a general purpose computer (e.g. a PC) or a server.

Figure 2:
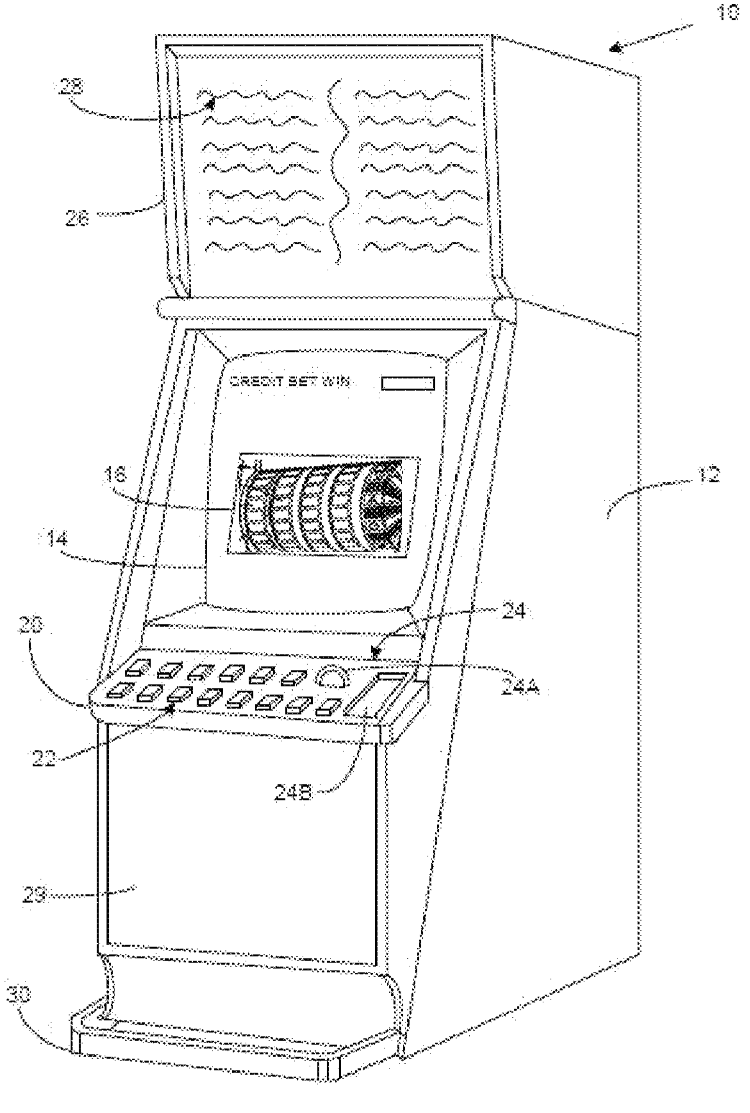
FIG. 2 is a schematic block diagram of functional components of an example gaming system.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
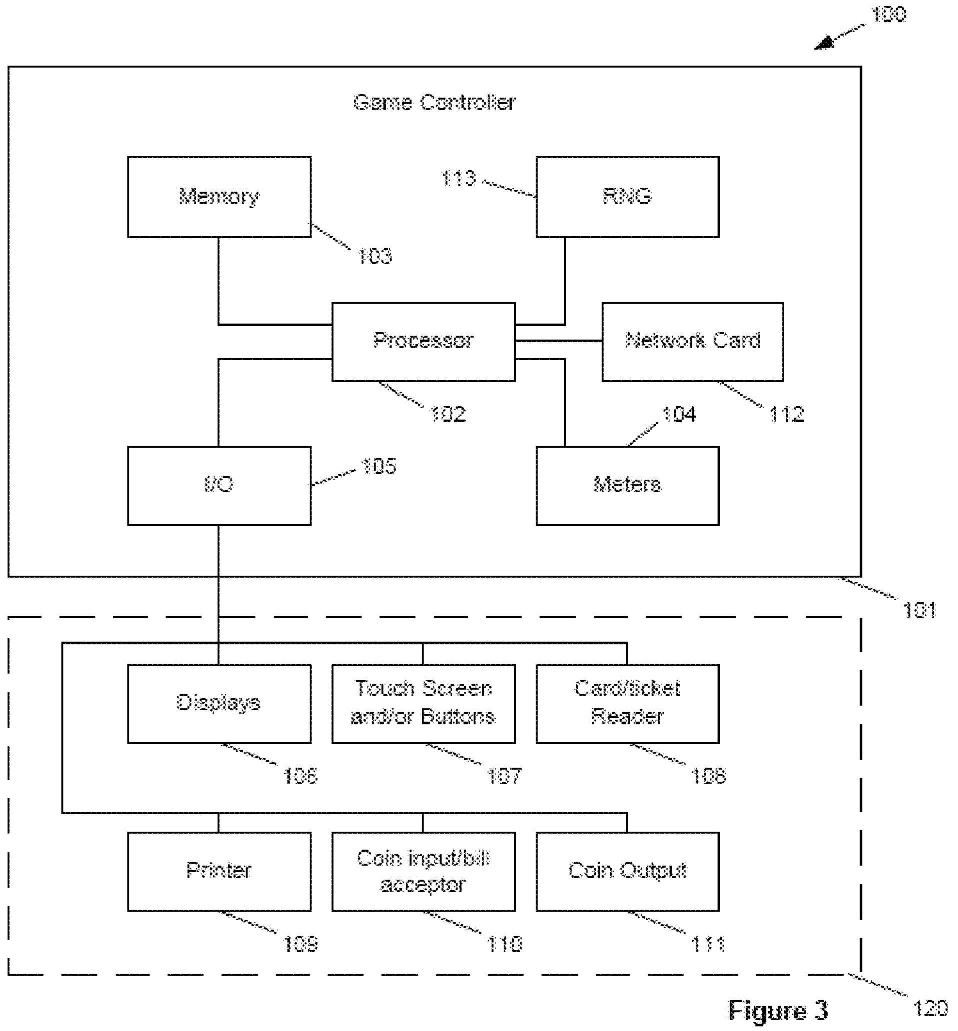
FIG. 3 is a diagrammatic representation of an example gaming system implemented in the form of a stand alone gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
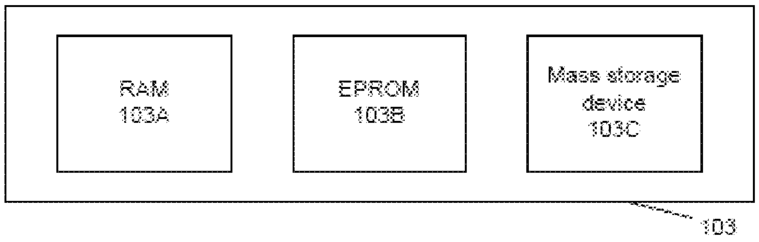
FIG. 4 is a schematic block diagram of components of an example memory of a gaming machine.

FIG. 4 shows a block diagram of the main components of an example memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
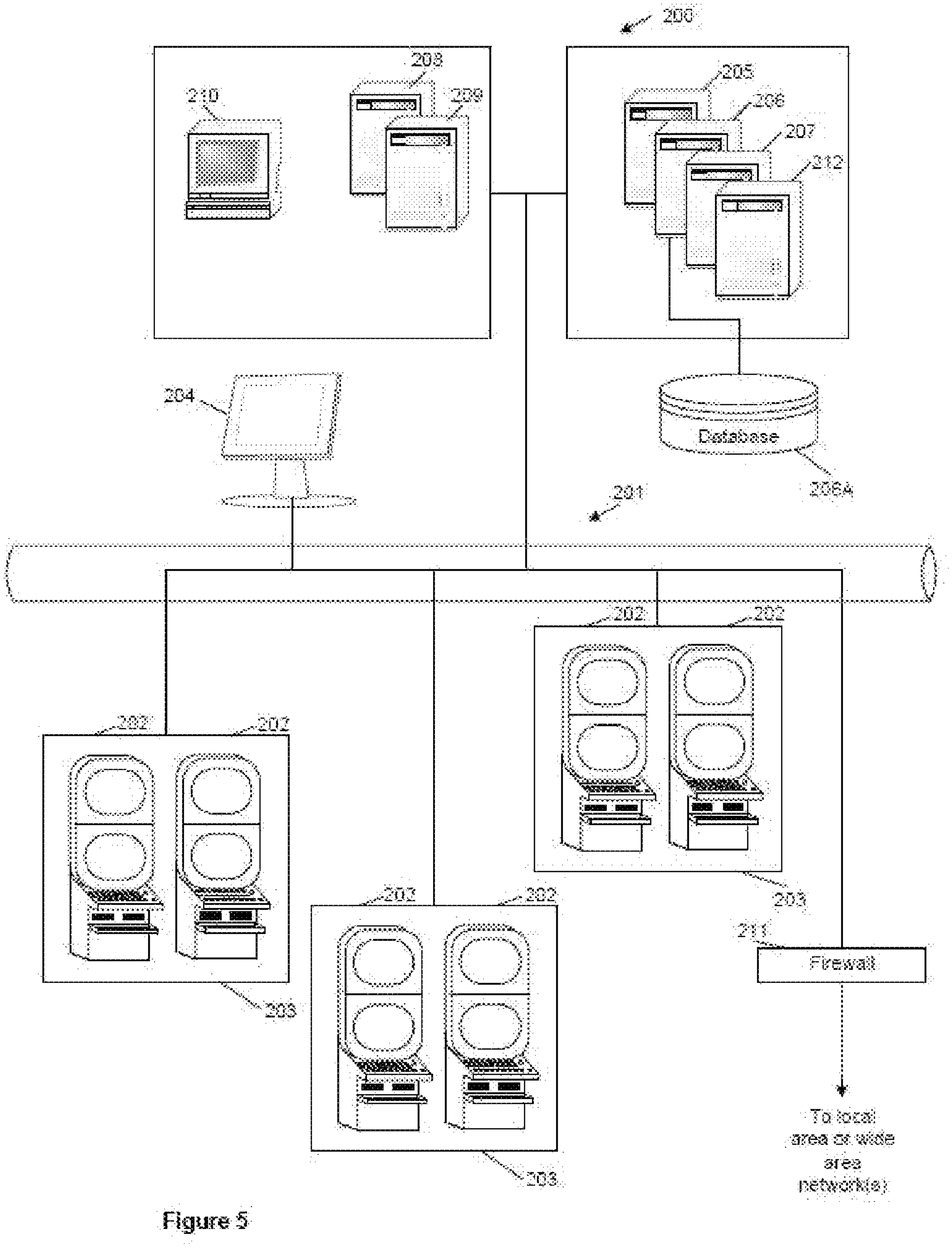
FIG. 5 is a schematic block diagram of operative components of an gaming machine implemented over a network.
Figure 5:
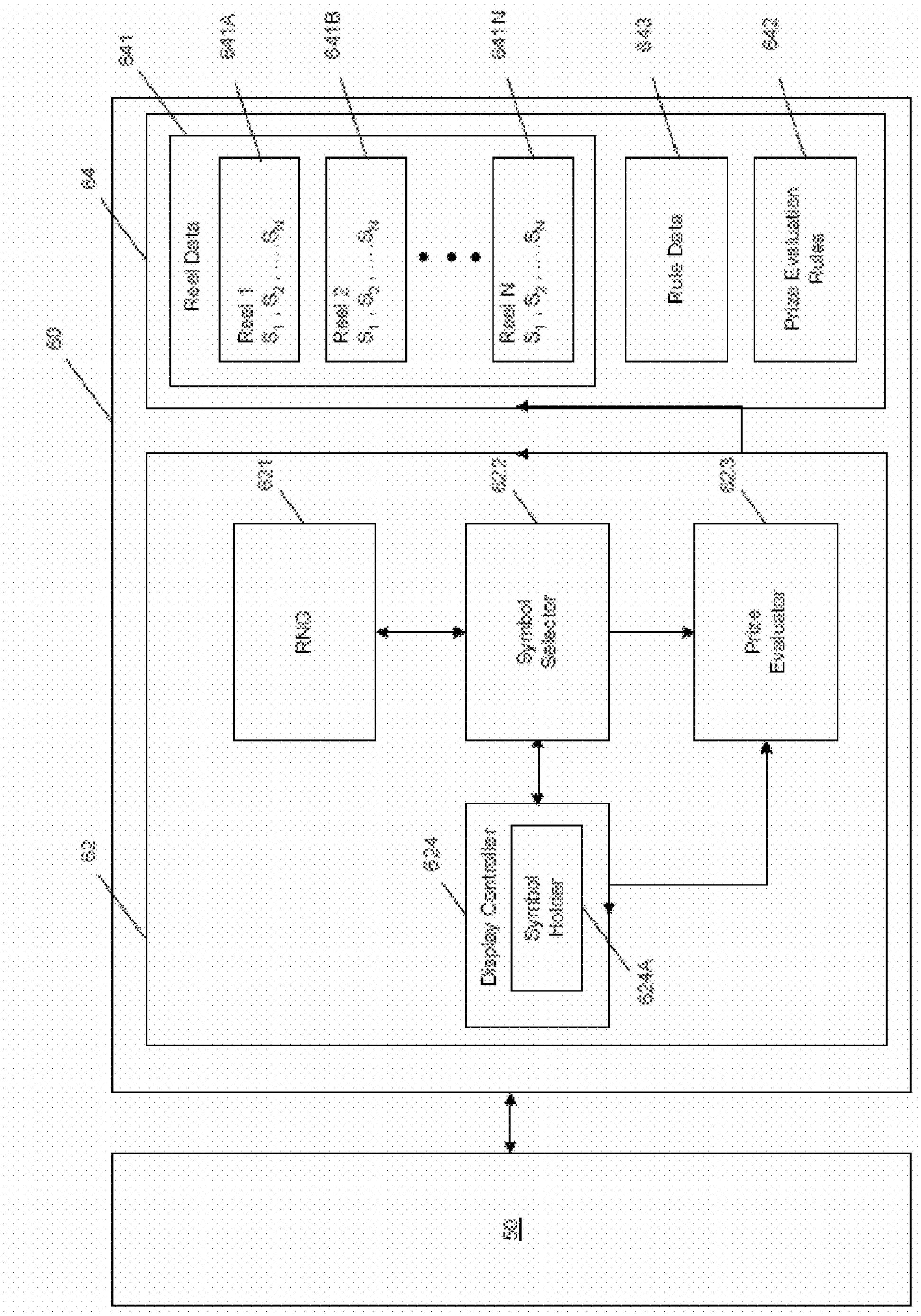

FIG. 5 shows a gaming system 200 in accordance with an alternative example. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the rules, guidelines, preferences, and/or requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g., PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

As individual games are played on the gaming machines 202, data including the contributions of individual games is sent over the network to the jackpot server 207, which performs the accounting functions for the progressive jackpot game. It will be appreciated that in a progressive jackpot, individual gaming machines may contribute towards a single jackpot or several jackpot pools, the value of which is maintained by the jackpot server 207. It will also be appreciated that in a progressive jackpot, data representing contributions received from the gaming machines is sent to the jackpot server 207 and the jackpot pool is incremented according to these contributions. However, it will be further appreciated that the jackpot pool and the jackpot prize available to be won by the player need not be the same value and thus the jackpot prize to be won by the player need not be incremented in relation to the incoming contributions and may be incremented in a different manner.

Furthermore, it will also be appreciated that a jackpot module of the game controller 60 may be used in collaboration with the jackpot server 207 to perform functions other than accounting, such as determining whether a jackpot prize should be awarded to a player, controlling the value of the contributions made by the gaming machines towards the jackpot pool and incrementing the jackpot prize. For example, the jackpot module may perform the function of determining whether the jackpot prize should increment and, if so, determining the value of which it is to increment.

In certain examples, the game controller 60 and jackpot server 207 provide an incremental award that is added to an award amount associated with the jackpot prize. A third party and/or gaming floor operator funds the incremental link award amount for a particular gaming establishment, group of gaming locations, subset of gaming machines, a particular game theme, etc. The award amount can be tied to a particular progressive link or a sub-award of that link, for example. The incremental link award can include an operator- and/or other sponsor-funded increment plus a jackpot prize that increases based on one or more metrics, criteria, etc., as specified by the operator, such as time, percentage of handle, percentage of coin-in, and/or other parameter(s) that curve over time. The controller 60 issues the link increments from a pre-established pool of cash, points, and/or other award(s) such as a pool derived from marketing and/or other similar funds not necessarily related to coin-in. Using the progressive link with an incremental link award allows an operator to offer players a familiar game and link but with an added incentive (e.g., special and/or higher award(s)) that is unique to that property, operator, and/or sponsor.

Alternatively or in addition, the controller 60 and jackpot server 207 apply an incremental award to one or more individual game awards rather than to a progressive link. The increased award can be provided by information exchanged between a gaming machine 202 and the controller 60 and can be set by the operator, for example. An increased base game award can be operated without the presence of a link (e.g., a progressive link), for example.

Referring now to FIG. 6, the player operates game play mechanism 56 to make a selection and input game instructions, selected from a plurality of available instructions, to the game controller 60. As described above, the game play mechanism 56 can be in the form of a touch screen and/or buttons. In an example, the player may qualify to participate in a progressive jackpot by playing a base game. The player may only participate in the progressive jackpot subject to an eligibility criterion such as playing the maximum credits available.

In an alternative example, the player may need to actively make a selection to participate in the progressive jackpot, for example by placing an ante bet. Typically, where a plurality of individual gaming machines contribute to a collective progressive jackpot prize, it is envisioned that the prize may be formed from the contributions of a single machine.

In one example, a game is conducted by the gaming machine with a progressive jackpot and an outcome generator 622 operates in response to the player's operation of game play mechanism 56 to generate a game outcome which will then be evaluated by outcome evaluator 623 and jackpot module 624. In an example, the outcome evaluator 623 evaluates the generated game outcome and the jackpot module 624 evaluates whether the generated game outcome corresponds to an event relating to the progressive jackpot. For example, the generated game outcome may correspond to a trigger event corresponding to the progressive jackpot being incremented in value. Alternatively, the trigger event may be a game event other than a game outcome, such as the number of games played.

In an example, a jackpot trigger event determiner 626 in the jackpot module 624 determines a generated game outcome or other game event corresponds to a trigger event to increment the progressive jackpot. However, it will be appreciated by a person skilled in the art that the determination of a trigger event may be made at the Jackpot server 207, rather than locally at the jackpot module 624, in the case where the gaming machine is connected across a network. In this scenario, data could be sent to the jackpot module 624 indicating that the progressive jackpot has increased or could be displayed on a display 54 controlled by the jackpot module of the game controller 60 and viewable from the gaming machine. Also, an indication to make an award, or that award has been made, of the progressive jackpot would be sent to the gaming machine played by the player.

In one example, the outcome generator 622 forms the game outcome by employing random number generator 621 to randomly select symbols from a set of symbols specified by symbol data 641. The selected symbols are advised to the display controller 625 which causes them to be displayed on display 54 at a set of display positions. In one example, outcome generator 622 selects symbols for display from a plurality of symbol sets corresponding to respective ones of a plurality of spinning reels. Thus, the symbol sets 641 specify a sequence of symbols for each reel such that the outcome generator 622 can, in one example, select symbols for display by selecting a stopping position in the sequence. In one example, three symbols of each of five reels may be displayed such that symbols are displayed at fifteen display positions on display 54.

In one example, the outcome evaluator 623 evaluates the game outcome generated by the outcome generator 622, displayed as symbols arranged at a set of display positions, to determine if the outcome corresponds to a winning combination specified in the prize data 642A based on game rules 642. For example, the game rules may specify that all combinations are evaluated left to right or can be evaluated right to left or both. Also, to obtain a desired return to player, a probability table having weighted outcomes may be stored in the game rules 642 and employed when selecting the symbols. In addition to these game rules, further rules for incrementing the progressive jackpot prize may be stored in the memory 64. For example, designated game outcomes may be stored in the game rules 642 as the corresponding combination of symbols to be determined by a jackpot trigger event determiner 626 of the jackpot module 624 as the event to trigger the prize displayed to the player be incremented.

Gaming machines may be implemented, for example, as slot machines, video poker machines, video roulette machines, and the like. Gaming machines may be located in a local gaming environment, such as a casino, and/or a multi-site gaming environment, such as a plurality of networked casinos. Gaming machines may be used to play a first game and/or a second game employing one or more progressive jackpots as a reward. In an example, a progressive jackpot used as a reward for a second game may be automatically determined by a gaming machine, progressive controller, and/or other server. A progressive jackpot may also or alternatively be selected by a player and/or determined by an outcome of the second game.

In an example, different games may store progressive jackpot data relating to different games. For example, gaming machines may store progressive jackpot data for a first progressive game, and gaming machines may store progressive jackpot data for a second progressive game. Jackpot meters that generate and store progressive jackpot data for the first progressive game are indicated as meters bearing the legend "JACKPOT 1", for example. Jackpot meters that generate and store progressive jackpot data for the second progressive game are indicated as meters bearing the legend "JACKPOT 2", for example.

In an example, one or more progressive games or amounts may be facilitated using one or more progressive links and/or one more levels within one or more links. A progressive link includes one or more gaming machines contributing to one or more progressive amounts eligible for a win on any of the linked gaming machine(s). A progressive link may include one or more levels or accumulating amounts. The progressive links may be running at one or more gaming environments, such as one or more casinos.

In certain examples, one or more progressive links and/or levels can provide progressive games that offer one or more incremental or contributory awards to some or all participating game players. A controller, such as a progressive controller, having bulk contribution or increment capabilities (e.g., Aristocrat Technologies Vertex controller) can be used to provide one or more progressive link awards across all or part of a casino floor and/or across multiple properties for individual and/or multiple-linked games. The controller system is used to generate pre-funded incremental link awards to one or more games across one or more sets of participating gaming machines (and/or other gaming devices). The system can be configurable, supporting variations in triggers, pay scenarios, funding mechanisms, and/or other parameters. Awards can include money, points, and/or other items of value (e.g., tickets, discounts, merchandise, trips, etc.), for example. Funding for bulk contributions may not be provided by player coin-in but rather but can rather be provided by additional cash contribution, points, merchandise, and/or other items of value provided by an operator, another vendor, and/or source of contribution (e.g., marketing, sales, lottery, individual, etc.).

In certain examples, the controller and connected machines form a progressive link with an award profile (e.g., mini jackpot, minor jackpot, major jackpot, grand jackpot). A casino management, advertiser, and/or other sponsor can fund additional or incremental increases to the link awards above the normal or standard link awards (e.g., via marketing or promotional funds, merchandise/event/trip giveaways, etc.). Thus, one operator can run the same link as another operator but have higher award value(s) for their link to provide an incentive for customers to visit their property(ies).

Rather than being set by the gaming machine manufacturer, incremental link award parameters can be configured by a site operator using its controller. Parameters can include but are not limited to start time, stop time, trigger, an award curve, etc. An award curve relates to a frequency and size of link award, for example. In a multi-property example, management for all properties can fund the incremental pool. In some examples, a third party entity can also fund the pool (e.g., the company providing the controller, a consumer product and/or service provider, other sponsor, etc.). In some examples, one or more advertisers can provide shopping points, Internet award points, stocks, bonds, and/or ecommerce money as an incremental link prize or reward.

Incremental link awards are increased and/or otherwise rolled up based on link criteria set between participating gaming machines and the attached link, such as a jackpot (e.g., Hyperlink® jackpot), a lack of a jackpot following a certain period of play, etc. In some examples, the amount of increment over the period can be tailored using a configurable curve related to a percentage of payout over the time period. Using a curve or spectrum to control the increment, an operator can choose to front load more of the bonus payouts at the beginning of the bonusing period, for example.

As discussed above, in some examples, the incremental link award pool can be funded with cash but implementations are not limited to cash only or monetary award pools. Other awards can include points (e.g., casino/hotel operator reward points, airline points, game provider points, etc.), sweepstake/raffle tickets, discounted or free rooms, discounted or free meals, discounted or free shows, discounted or free travel, discounted or free merchandise, etc.

Triggers for the incremental award increase can include jackpots, such as a jackpot award to a player wherein the controller would add the additional/incremental award on top of the jackpot award. Triggers can also include a lack of jackpot and/or other award for a given amount of game play (and/or a given amount of elapsed time), random mystery payouts, a fixed increment rate based on time (e.g., a meter increase in "bulk" increments), etc. Awards of the link amounts can be based on the game(s) and link logic, for example.

In certain examples, incremental link award periods and/or criteria can be scheduled in advance. For example, an operator can configure an incremental link award such that on Tuesday at 9:00 AM at his/her Las Vegas property all JAWS® link awards are to increase by ten percent (10%) every fifteen minutes with funding provided by casino marketing money bolstered by Aristocrat marketing money and a featured sponsor's marketing dollars. Different periods of award and/or criteria can overlap, for example.

In some examples, individual game awards can be increased by an amount determined by the operator and funded by the operator and/or other source. While the controller resolves and distributes funding, the award is not considered a jackpot but rather is related to the individual game award. The incremental amount increases the individual game award to make a game that would otherwise be the same as in other locations unique to a particular operator and/or location.

Figure 7:
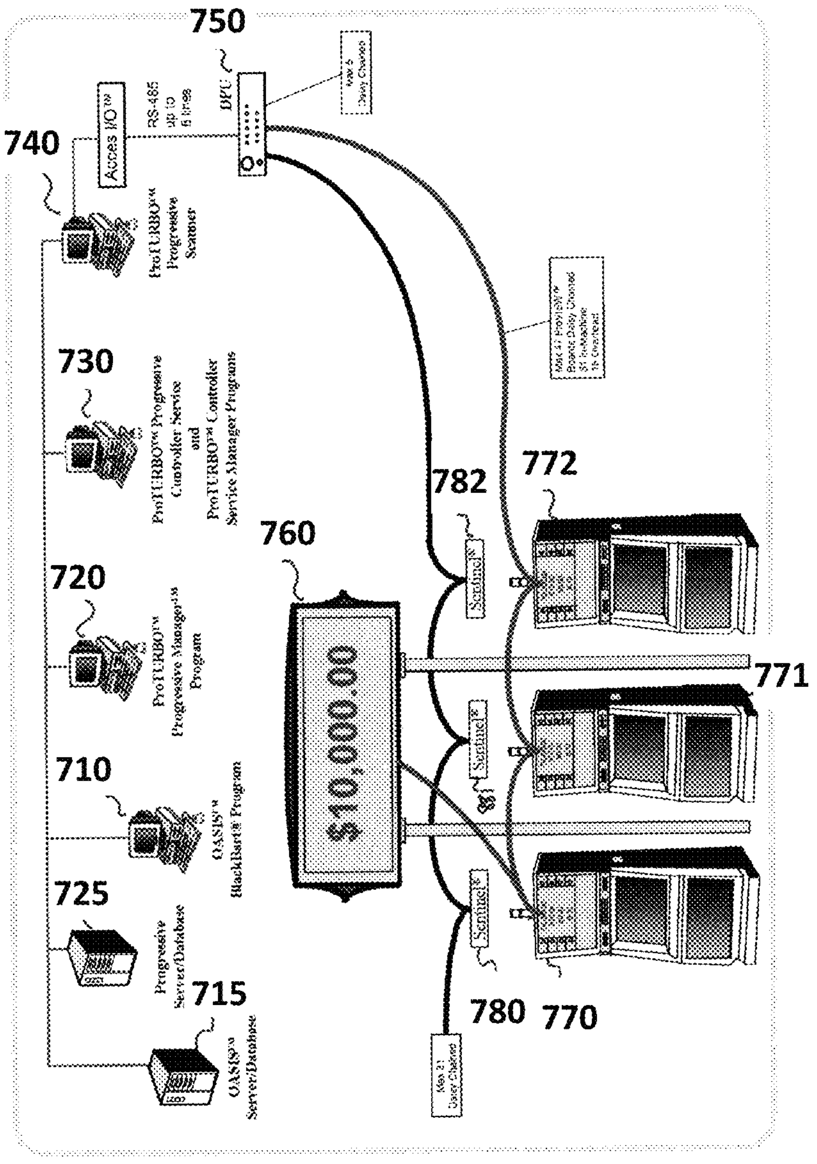
FIG. 7 is a schematic diagram of an example progressive system with a progressive manager.

In an example, one or more progressive links may be facilitated using a progressive management system. An example of a progressive system 700 with a progressive manager is illustrated in FIG. 7. The progressive system 700 includes a casino manager 710, a progressive manager 720, a progressive controller 730, a progressive scanner 740, a data port unit (DPU) 750, a progressive display 760, and a plurality of gaming machines 770, 771, 772 with interface units 780, 781, 782. The system 700 may also include a casino management server/database 715 and/or a progressive server/database 725. The components of the system 700 may be implemented in software and/or in hardware and may be separated and/or integrated in a variety of forms. The progressive system 700 combines player tracking and slot accounting features with features for progressive games and display of progressive jackpots on screens and meters.

The interface units 780-782, such as Sentinel®-based communications interface boards, facilitate communication and monitoring of gaming machines 770-772 by the casino manager 710 and/or progressive manager 720. For example, the interface unit 780 monitors signals from the gaming machine 770. Information from the gaming machines 770-772 is provided to the DPU 750 via the interface units 780-782. A single DPU 750 may be dedicated to a single interface unit 780-782 or may interact with a plurality of interface units 780-782. The DPU 750 may be used to poll the interface units 780-782 for data from gaming machines 770-772. Alternatively, the interface units 780-782 initiate communication with the DPU 750. Gaming machine 770-772 information may include coin in, coin out, coin drop, bill transactions, jackpot signals, and/or jackpot amounts (e.g., progressive, bonus, and/or other winning amount), for example. In an example, one or more of the gaming machines 770-772 may communicate with the system 700 without use of the interface units 780-782. For example, the gaming machines 770-772 may communicate with the DPU 750, the progressive controller 730, and/or the progressive scanner 740.

The progressive scanner 740 receives data, such as transaction data, meter data and/or status information, from the interface units 780-782. In an example, the scanner 740 obtains data from the interface units 780-782 and/or from the gaming machines 770-772. In another example, the scanner 740 polls the DPU 750 which polls the interface units 780-782 to obtain data. The progressive scanner 740 communicates with the progressive controller 730 to store data in the database 725. In an example, the scanner 740 includes a user interface. The user interface may provide information regarding, for example, scanner 740 activity and control, real-time interface unit 780-782 information, real-time transaction information (e.g., the most recent 100 transactions), polling and other communication or message data, configuration information and control, and/or operator commands. The scanner 740 may be used to connect a plurality of interfaces 780-782 through zero or more DPUs 750. In an example, the system 700 may include a plurality of scanners 740 for greater machine capacity, improved operational flexibility, data handling, and/or throughput.

The progressive controller 730 may be used to perform database updates in the progressive system 700. Information inserted or updated in the progressive database 725 may be routed through the progressive controller 730. The progressive controller 730 may receive information requests from the scanner 740 and returns data from the database 715, 725. The progressive controller 730 stores transaction information in the database 715 and/or database 725. The progressive controller 730 may query the progressive database 725 for progressive amount information and transmit the data to the scanner 740. The progressive controller 730 may clear and/or configure progressive jackpot signals and/or other signals based on transaction data and/or other information, for example. The progressive controller 730 may read configuration and input/output access information for the system 700.

The progressive controller 730 may include a progressive controller service manager. The progressive controller service manager may be used to configure data paths and/or other parameters between servers, workstations, and/or databases in the system 700. The service manager may be used to provide debugging and/or status information, for example. The progressive controller service manager may include a user interface, such as a graphical user interface, allowing a user to view system status and other information, for example.

The progressive manager 720 allows authorized users to configure progressive links/levels, including adding and removing games and/or progressive links/levels, meters, and/or setting jackpot reset amounts and rate of progression, for example. Users and/or software may configure progressive system parameters using a user interface running on the progressive manager 720 and/or a workstation in communication with the progressive manager 720, for example. The progressive manager 720 monitors, in real-time, for example, progressive levels, payouts, and statistics for machines 770-772 contributing to progressive jackpots. Progressive links/levels may be adjusted, configured, and/or reset via the progressive manager 720. Reports, such as accounting, diagnostic and administrative reports, may also be generated using the progressive manager 720. The progressive manager 720 may generate progressive amount and/or other information for display via progressive display 760 and/or gaming machine 770-772 display, for example. The progressive manager 720 may access databases 715, 725 to aid in report generation, progressive configuration, and/or other system adjustment, for example.

Thus, the progressive manager 720, such as a ProTURBOT™ progressive manager or Vertex™ bonus controller, allows centralized control of one or more progressives in a gaming environment. The progressive manager 720 may be used to monitor progressive activity and perform a variety of functions. For example, the manager 720 may allow assignment of user access rights to the progressive system 700. The manager 720 may allow a user to view current progressive amounts on all progressive links, for example. Additionally, the manager 720 may allow a user to view current and historical progressive transactions, for example. Progressive links may be cleared, reset, and/or adjusted via the progressive manager 720, for example. Furthermore, the progressive manager 720 may be used to assist in troubleshooting problems occurring in the DPU 750, interfaces 780-782, gaming machines 770-772, and/or other system components. In an example, a progressive revenue audit may be performed via the progressive manager 720. Additional functions available via the progressive manager 720 may include set up and configuration of progressive link setting, such as jackpot levels, increment rates, and reset values, generation of a series of selectable reports, and viewing transactions and pending jackpot information, for example.

The casino manager 710 facilities player tracking, slot accounting, game configuration, and bonusing, for example, in the system 700. The casino manager 710, such as an OASIS™ casino management system, may also facilitate promotions, ticket generation, marketing, reporting, crediting, and communication between players, gaming employees, and the system 700, for example. The casino manager 710 may be used for game configuration and modification for gaming machines 770-772, for example. The casino manager 710 helps to provide centralized management of a gaming environment, such as one or more casinos.

Figure 8:
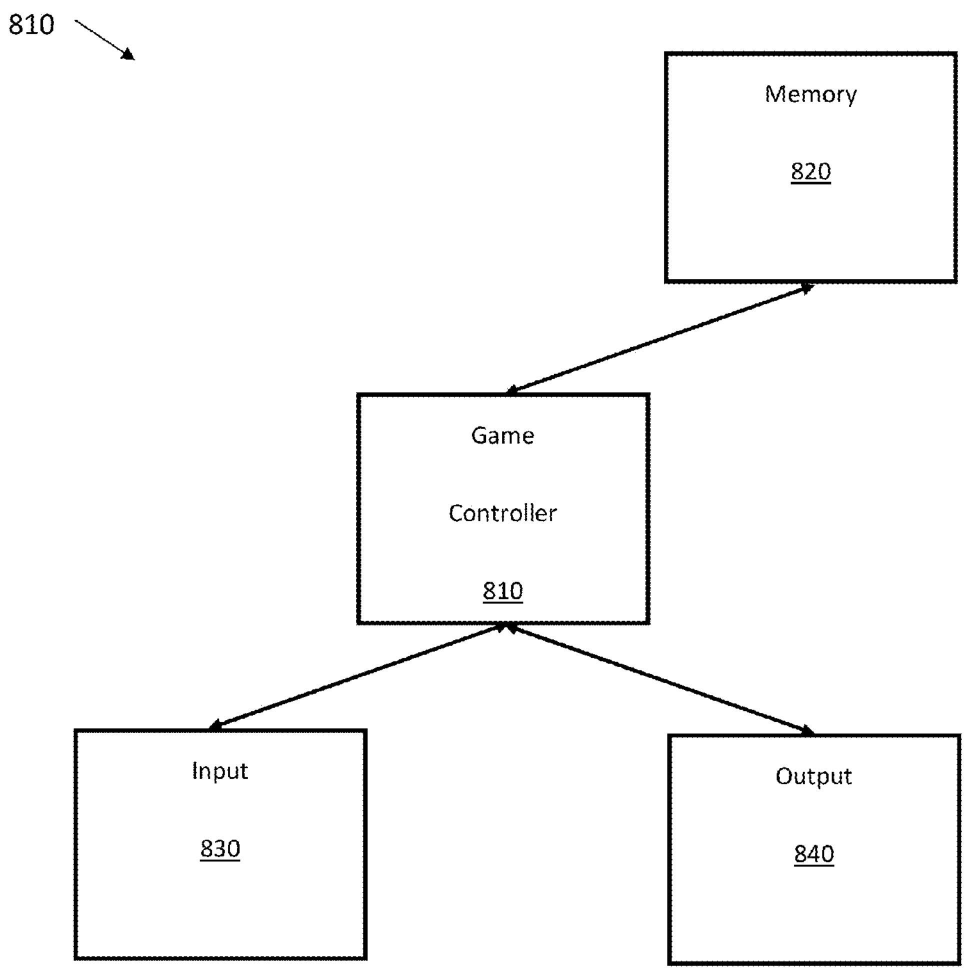
FIG. 8 illustrates an example gaming system.

FIG. 8 illustrates an example gaming system 800 including a game controller 810, a memory 820, an input 830, and an output 840. The gaming system 800 and its game controller 810 can facilitate play of one or more games, including a game associated with a progressive link. The game controller 810 can include and/or be associated with a progressive and/or other jackpot controller to facilitate game play and connection to an award, such as a progressive prize associated with a progressive link, for example.

The award can be stored in the memory 820 along with an incremental award that can be associated with and funded apart from the progressive award associated with the progressive link, for example. The base award is a progressive award funded by player contribution through game play, for example. The game controller 810 is configured to award the progressive award plus the incremental award to a player based on a criterion established by an operator associated with the progressive link. In some examples, the incremental award is to increment based upon a link criterion set between the progressive link and one or more gaming machines associated with the progressive link. In some examples, the incremental award is to increment based upon an operator configurable curve related to a percentage of payout over a time period. The incremental award can be a monetary award, a non-monetary award, a combination award, etc. The incremental award can be drawn from a pre-established pool of cash or points, for example. The incremental award can be funded by an operator associated with the progressive link, by a third party vendor not associated with the progressive link, etc.

In some examples, the progressive link includes a plurality of sub-links, and the progressive award includes a plurality of sub-awards each associated with a sub-link. The incremental award is tied to a sub-award of a sub-link of the progressive link. The progressive link can span multiple gaming establishments, for example. A game can be played for the base or progressive award plus the incremental award across multiple gaming establishments, for example.

In some examples, the criterion to award the progressive award plus the incremental award includes a certain period of time. In other examples, the criterion to award the progressive award plus the incremental award includes a trigger based on one or more of a lack of an award payout for a certain amount of game play, a random mystery payout, and a fixed increment rate based on time, etc.

In some examples, the incremental award is to be awarded along with the base award in a special game mode. For example, the game controller 810 can commence the special game mode on the basis of a game event occurring during the game including display of a particular symbol, in response to player input, based on the amount or type of bet placed, when a special game is purchased by a player, etc.

Figure 9:
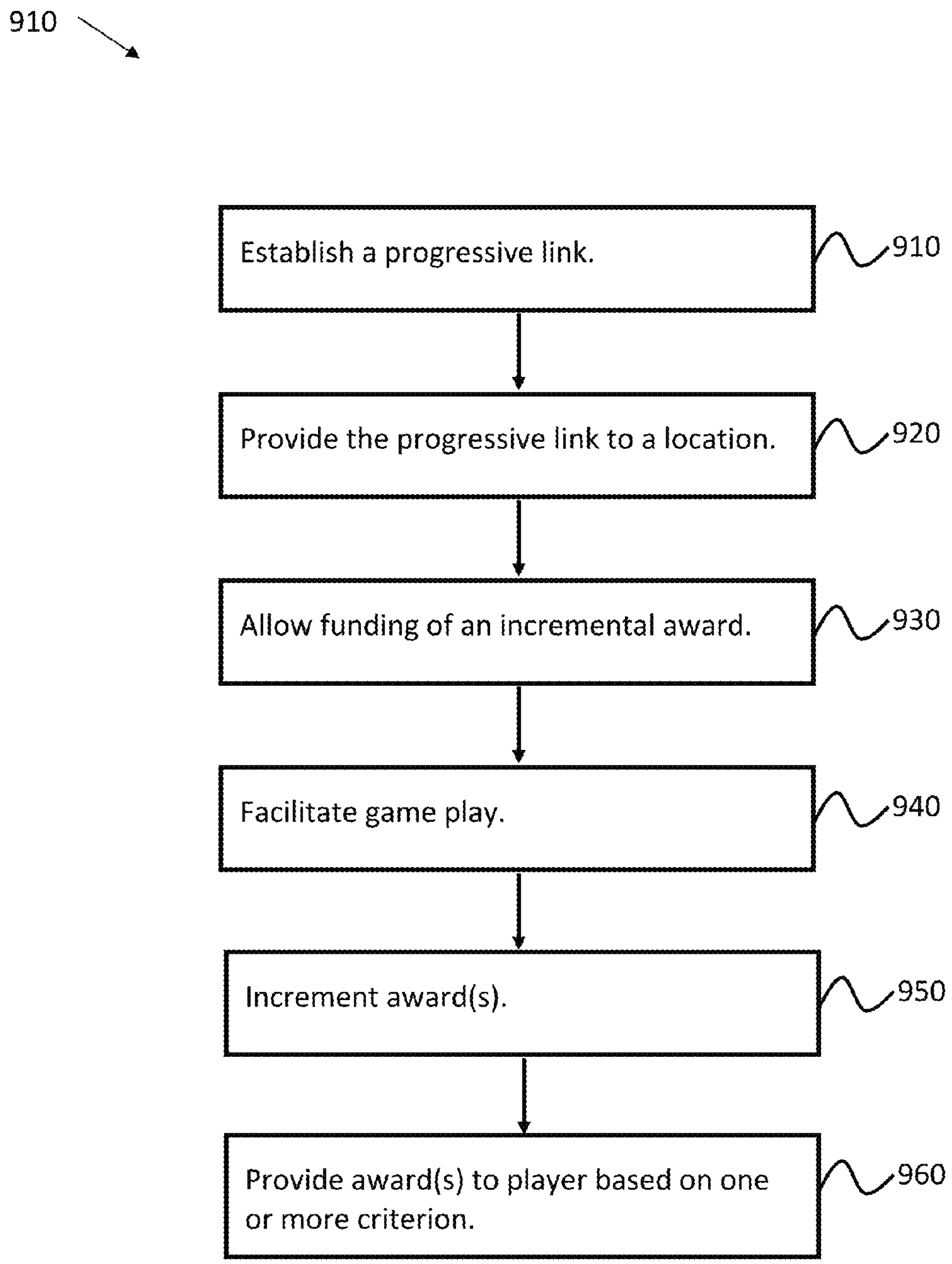
FIG. 9 is a flow diagram illustrating an example method for game play of a gaming system.

FIG. 9 depicts an example flow diagram representative of processes that may be implemented using, for example, computer readable instructions that may be used to facilitate game play. The example processes of FIG. 9 may be performed using a processor, a controller and/or any other suitable processing device. For example, the example processes of FIG. 9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 9 may be implemented manually or as any combination(s) of any of the foregoing techniques, for example, any combination of firmware, software, discrete logic and/or hardware. Further, although the example processes of FIG. 9 are described with reference to the flow diagram of FIG. 9, other methods of implementing the processes of FIG. 9 may be employed. For example, the order of execution of the blocks may be changed, and/or some of the blocks described may be changed, eliminated, sub-divided, or combined. Additionally, any or all of the example processes of FIG. 9 may be performed sequentially and/or in parallel by, for example, separate processing threads, processors, devices, discrete logic, circuits, etc.

FIG. 9 illustrates a flow diagram for an example method 900 to provide a progressive game including a progressive award plus an incremental award. At block 910, a progressive link is established. The progressive link can offer one or more levels and/or one or more awards associated with each link, for example. The progressive link can extend across multiple gaming establishments for play by one or more players at each of the multiple gaming establishments, for example.

At block 920, the progressive link is provided to at least one casino or other gaming location. For example, a game provider, casino operator, and/or other property manager can offer access to a progressive link adapted for play by a plurality of players. Each player has a chance to win a progressive award associated with the progressive link.

At block 930, the casino or other gaming location is allowed to fund an increment or addition to an award offered in association with the progressive link. For example, a game provider, casino operator, property manager, and/or third party sponsor or vendor can provide an incremental award in association with the progressive link. The incremental award can be funded apart from player contribution to the progressive award through wagering associated with the progressive link. The incremental or supplemental award can be a monetary award, a non-cash award, and/or a combination of cash-based and non-cash-based award, for example. The incremental award can be drawn from a pre-established pool of cash and/or points, for example.

At block 940, play of a game associated with the progressive link is facilitated. As the game is played by one or more players, one or more criterion are examined to determine whether a prize should be awarded, an award should be incremented, a special, feature, and/or bonus game should be triggered, etc. At block 950, if an award should be incremented, the progressive award can be incremented based on player wager (e.g., coin in) and/or other game play. The incremental award can also increment based upon a criterion set between the game and one or more gaming machines associated with the progressive link, for example. For example, the incremental award can increment based upon an operator configurable curve related to a percentage of payout over a time period.

At block 960, if an award should be provided to a player, the progressive award plus the incremental award can be given to the player based on an award criterion. The progressive award plus incremental award can be provided to the player via monetary payment at a gaming device, redeemable ticket/receipt printing at the gaming device, transfer of monetary and/or non-monetary award(s) to an account associated with the player, hand pay by cashier, etc. The award criterion, for example, can include passage of a certain period of time (e.g., a certain period of play and/or a certain period of time since a last award). The award criterion to award the progressive award plus the incremental award can include a trigger based on at least one of a lack of an award payout for a certain amount of game play, a random mystery payout, and a fixed increment rate based on time, for example.

One or more components of the method 900 may be implemented alone or in combination in hardware, firmware, and/or as a set of instructions in software, for example. Certain examples may be provided as a set of instructions residing on a computer-readable medium, such as a memory, hard disk, DVD, Blu-ray, or CD, for execution on a general purpose computer or other processing device.

Certain examples may omit one or more of these components and/or perform the components in a different order than the order listed. For example, some components may not be performed in certain examples. As a further example, certain components may be performed in a different temporal order, including simultaneously, than listed above.

Figure 10:
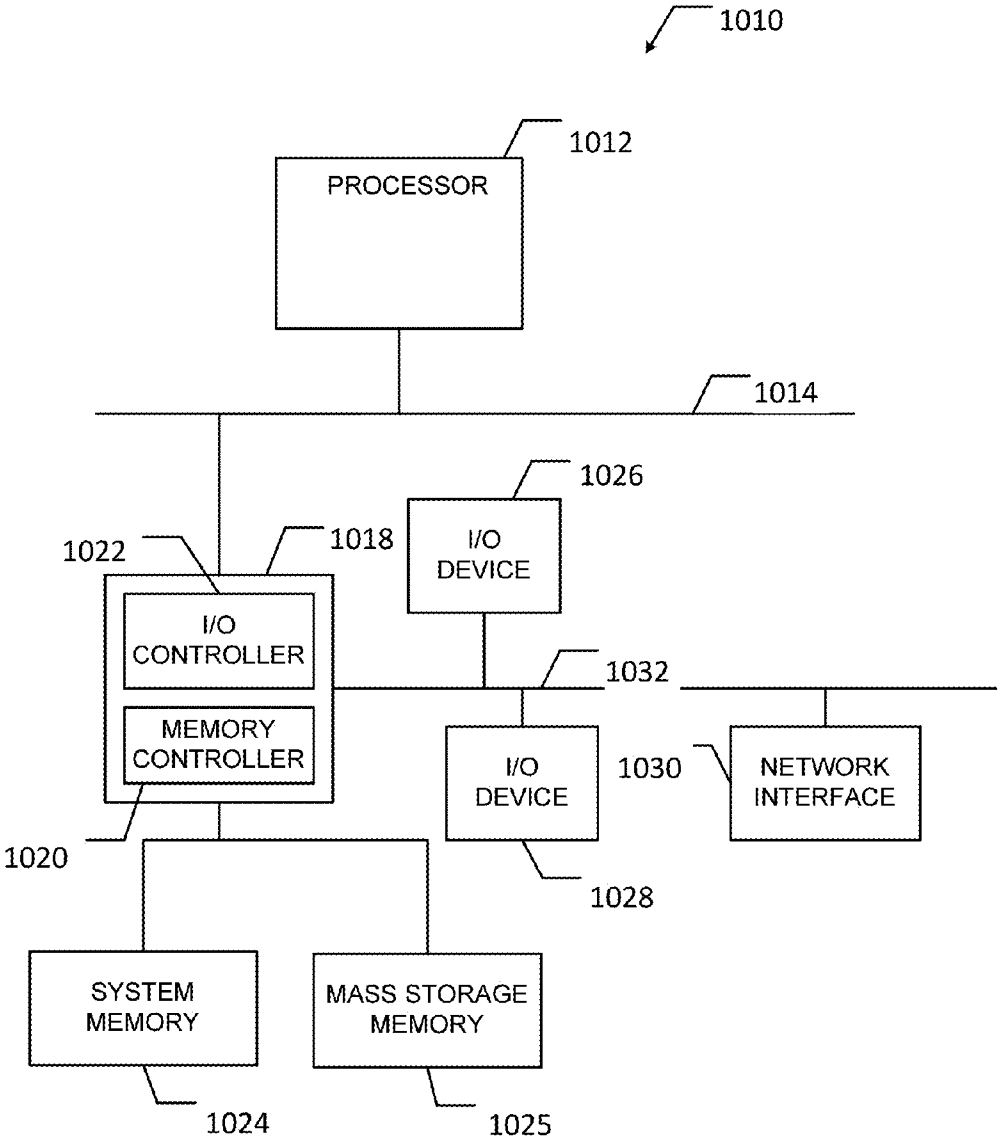
FIG. 10 is a block diagram of an example processor system that can be used to implement systems, apparatus, and methods described herein.

FIG. 10 is a block diagram of an example processor system 1010 that can be used to implement systems, apparatus, and methods described herein. As shown in FIG. 10, the processor system 1010 includes a processor 1012 that is coupled to an interconnection bus 1014. The processor 1012 can be any suitable processor, processing unit, or microprocessor, for example. Although not shown in FIG. 10, the system 1010 can be a multi-processor system and, thus, can include one or more additional processors that are identical or similar to the processor 1012 and that are communicatively coupled to the interconnection bus 1014.

The processor 1012 of FIG. 10 is coupled to a chipset 1018, which includes a memory controller 1020 and an input/output ("I/O") controller 1022. The chipset 1018 provides I/O and memory management functions as well as a plurality of general purpose and/or special purpose registers, timers, etc., that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output ("I/O") devices 1026 and 1028 and a network interface 1030 via an I/O bus 1032. The I/O devices 1026 and 1028 may be any desired type of I/O device such as, for example, a keyboard, a video display or monitor, a mouse, etc. The network interface 1030 may be, for example, an Ethernet device, an asynchronous transfer mode ("ATM") device, an 802.11 device, a DSL modem, a cable modem, a cellular modem, etc. that enables the processor system 1010 to communicate with another processor system.

While the memory controller 1020 and the I/O controller 1022 are depicted in FIG. 10 as separate blocks within the chipset 1018, the functions performed by these blocks may be integrated within a single semiconductor circuit or may be implemented using two or more separate integrated circuits.

Other variations would be apparent to persons skilled in the art and should be considered as falling within the scope of the invention described herein. In particular, further embodiments can be formed from the features described above.

One or more of the components of the systems and/or blocks of the methods described above may be implemented alone or in combination in hardware, firmware, and/or as a set of instructions in software, for example. Certain embodiments may be provided as a set of instructions residing on a computer-readable medium, such as a memory, hard disk, DVD, Blu-ray, or CD, for execution on a general purpose computer or other processing device. Certain embodiments of the present invention may omit one or more of the method blocks and/or perform the blocks in a different order than the order listed. For example, some blocks may not be performed in certain embodiments of the present invention. As a further example, certain blocks may be performed in a different temporal order, including simultaneously, than listed above.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Examples can be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples can also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A gaming system providing a progressive link, said system comprising:

a game controller arranged to facilitate play of a game by a player in association with a progressive link, the progressive link including a progressive award, at least one parameter for awarding the progressive award being determined by a first party; and an incremental award stored in a memory, the incremental award associated with the progressive award being associated with the progressive link and being funded by at least a second party, at least one parameter for awarding the incremental award being determined by said second party, wherein the game controller is to award the progressive award plus the incremental award to a player based on a criterion established by said second party, and wherein said first and second parties are different from each other.

2. The gaming system of claim 1, wherein the incremental award is to increment based upon a link criterion set between the progressive link and one or more gaming machines associated with the progressive link.

3. The gaming system of claim 1, wherein the incremental award is to increment based upon an operator configurable curve related to a percentage of payout over a time period.

4. The gaming system of claim 1, wherein the incremental award is a monetary award.

5. The gaming system of claim 1, wherein the incremental award is a non-cash award.

6. The gaming system of claim 1, wherein the second party comprises an operator associated with the progressive link.

7. The gaming system of claim 1, wherein the incremental award is provided by a third party vendor not associated with the progressive link.

8. The gaming system of claim 1, wherein the incremental award is drawn from a pre-established pool of cash or points.

9. The gaming system of claim 1, wherein the progressive link comprises a plurality of sub-links and the progressive award comprises a plurality of sub-awards each associated with a sub-link, and wherein the incremental award is tied to a sub-award of a sub-link of the progressive link.

10. The gaming system of claim 1, wherein the criterion to award the progressive award plus the incremental award includes a certain period of time.

11. The gaming system of claim 1, wherein the criterion to award the progressive award plus the incremental award includes a trigger based on at least one of a lack of an award payout for a certain amount of game play, a random mystery payout, and a fixed increment rate based on time.

12. The gaming system of claim 1, wherein the progressive link spans multiple gaming establishments.

13. A game controller arranged to facilitate play of a game for a base award plus an incremental award stored in a memory, at least one parameter for awarding the base award being determined by a first party, the incremental award associated with the base award and being funded by at least a second party, at least one parameter for awarding the incremental award being determined by said second party, wherein the game controller is to award the base award plus the incremental award to a player based on a criterion established by said second party, and wherein said first and second parties are different from each other.

14. The game controller of claim 13, wherein the game is associated with a progressive link, and the base award is a progressive award funded by player contribution through game play.

15. The game controller of claim 13, wherein the game controller comprises a jackpot controller.

16. The game controller of claim 13, wherein the incremental award is to increment based upon a criterion set between the game and one or more gaming machines associated with the progressive link.

17. The game controller of claim 13, wherein the incremental award is to increment based upon an operator configurable curve related to a percentage of payout over a time period.

18. The game controller of claim 13, wherein the incremental award is a monetary award.

19. The game controller of claim 13, wherein the incremental award is a non-cash award.

20. The game controller of claim 13, wherein the second party comprises an operator associated with the game.

21. The game controller of claim 13, wherein the incremental award is provided by a third party vendor not associated with the game.

22. The game controller of claim 13, wherein the incremental award is drawn from a pre-established pool of cash or points.

23. The game controller of claim 13, wherein the criterion to award the base award plus the incremental award includes a certain period of time.

24. The game controller of claim 13, wherein the criterion to award the base award plus the incremental award includes a trigger based on at least one of a lack of an award payout for a certain amount of game play, a random mystery payout, and a fixed increment rate based on time.

25. The game controller of claim 13, wherein the game is arranged to be played for the base award plus the incremental award across multiple gaming establishments.

26. The game controller of claim 13, wherein the incremental award is to be awarded with the base award in a special game mode.

27. The game controller of claim 13, wherein the game controller is to commence the special game mode on the basis of a game event occurring during the game including display of a particular symbol, in response to player input, based on the amount or type of bet placed, or when a special game is purchased by a player.

28. A method of gaming comprising:

offering access to a progressive link adapted for play by a plurality of players, each player having a chance to win a progressive award associated with the progressive link, at least one parameter for awarding the progressive award being determined by a first party;

providing an incremental award in association with the progressive link, the incremental award funded apart from player contribution to the progressive award through wagering associated with the progressive link, the incremental award being funded by at least a second party, at least one parameter for awarding the incremental award being determined by said second party;

facilitating play of a game associated with the progressive link; and awarding the progressive award plus the incremental award to a player based on an award criterion, wherein said first and second parties are different from each other.

29. The method of claim 28, wherein the incremental award is to increment based upon a criterion set between the game and one or more gaming machines associated with the progressive link.

30. The method of claim 28, wherein the incremental award is to increment based upon an operator configurable curve related to a percentage of payout over a time period.

31. The method of claim 28, wherein the incremental award is a monetary award.

32. The method of claim 28, wherein the incremental award is a non-cash award.

33. The method of claim 28, wherein the second party comprises an operator associated with the game.

34. The method of claim 28, wherein the incremental award is provided by a third party vendor not associated with the game.

35. The method of claim 28, wherein the incremental award is drawn from a pre-established pool of cash or points.

36. The method of claim 28, wherein the award criterion to award the progressive award plus the incremental award includes a certain period of time.

37. The method of claim 28, wherein the award criterion to award the progressive award plus the incremental award includes a trigger based on at least one of a lack of an award payout for a certain amount of game play, a random mystery payout, and a fixed increment rate based on time.

38. The method of claim 28, wherein the game is arranged to be played for the progressive award plus the incremental award across multiple gaming establishments.

39. A non-transitory computer readable storage medium having computer readable program code embodied therein for causing a computer to provide a method of gaming, the method comprising:

offering access to a progressive link adapted for play by a plurality of players, each player having a chance to win a progressive award associated with the progressive link, at least one parameter for awarding the progressive award being determined by a first party;

providing an incremental award in association with the progressive link, the incremental award funded apart from player contribution to the progressive award through wagering associated with the progressive link, the incremental award being funded by at least a second party, at least one parameter for awarding the incremental award being determined by said second party;

facilitating play of a game associated with the progressive link; and awarding the progressive award plus the incremental award to a player based on an award criterion, wherein said first and second parties are different from each other.

40. The computer readable storage medium of claim 39, wherein the incremental award is to increment based upon a criterion set between the game and one or more gaming machines associated with the progressive link.

41. The computer readable storage medium of claim 39, wherein the incremental award is to increment based upon an operator configurable curve related to a percentage of payout over a time period.

42. The computer readable storage medium of claim 39, wherein the incremental award is a monetary award.

43. The computer readable storage medium of claim 39, wherein the incremental award is a non-cash award.

44. The computer readable storage medium of claim 39, wherein the second party comprises an operator associated with the game.

45. The computer readable storage medium of claim 39, wherein the incremental award is provided by a third party vendor not associated with the game.

46. The computer readable storage medium of claim 39, wherein the incremental award is drawn from a pre-established pool of cash or points.

47. The computer readable storage medium of claim 39, wherein the award criterion to award the progressive award plus the incremental award includes a certain period of time.

48. The computer readable storage medium of claim 39, wherein the award criterion to award the progressive award plus the incremental award includes a trigger based on at least one of a lack of an award payout for a certain amount of game play, a random mystery payout, and a fixed increment rate based on time.

49. The computer readable storage medium of claim 39, wherein the game is arranged to be played for the progressive award plus the incremental award across multiple gaming establishments.

* * * * *